(12) United States Patent
Umeda et al.

(10) Patent No.: US 6,204,586 B1
(45) Date of Patent: Mar. 20, 2001

(54) STATOR ARRANGEMENT OF VEHICLE AC GENERATOR

(75) Inventors: Atsushi Umeda, Okazaki; Tsutomu Shiga, Nukata-gun; Shin Kusase, Obu, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/443,385

(22) Filed: Nov. 19, 1999

(30) Foreign Application Priority Data

Nov. 25, 1998 (JP) .................................. 10-334386
Jul. 28, 1999 (JP) .................................. 11-214031
Oct. 14, 1999 (JP) .................................. 11-292607

(51) Int. Cl.$^7$ ................................. H02K 3/50; H02K 3/04
(52) U.S. Cl. ..................... 310/179; 310/180; 310/184; 310/201; 310/260
(58) Field of Search .................... 310/254, 179, 310/180, 184, 42, 260, 201

(56) References Cited

U.S. PATENT DOCUMENTS 3,075,112 * 1/1963 Andersen et al. .................. 310/260
4,309,634 * 1/1982 Koroly et al. ..................... 310/201
5,508,571 * 4/1996 Shafer ................................ 310/71

FOREIGN PATENT DOCUMENTS

| 2-214445 | 8/1990 | (JP) | H02K/15/04 |
| 2927288 | 5/1999 | (JP) | H02K/19/22 |
| 1451806 * | 1/1989 | (SU) | H02K/3/50 |
| 92/06527 | 4/1992 | (WO) | H02K/3/12 |
| 98/54823 | 12/1998 | (WO) | H02K/19/22 |

\* cited by examiner

Primary Examiner—Burton Mullins
(74) Attorney, Agent, or Firm—Pillsbury Madison & Sutro LLP (57) ABSTRACT

A stator of a vehicle AC generator includes a stator core having a plurality of slots and a plurality of phase-windings formed of a plurality of conductor members inserted in said plurality of slots. The stator winding has first and second coil-end groups formed of portions of the conductor members respectively extending from the slots to opposite ends of the stator core. Each of the phase-windings has a lead-end which partially covered with an insulation member and extends along the first coil-end group to be connected to one another. The insulation member is bonded to the first coil-end group.

14 Claims, 10 Drawing Sheets

STATOR ARRANGEMENT OF VEHICLE AC GENERATOR

CROSS REFERENCE TO RELATED APPLICATION

The present application is based on and claims priority from the following Japanese Patent Applications: Hei 10-334386, filed Nov. 25, 1998; Hei 11-214031, filed Jul. 28, 1999; and Hei 11-292607, filed Oct. 14, 1999; the contents of which are incorporated herein by reference.

BACKGROUND OF THE INVENTION

1. Field of the Invention

The present invention relates to a rotary electric machine, and particularly to a stator lead-wire arrangement of an AC generator for a vehicle.

2. Description of the Related Art

Both star-connected phase-windings and delta-connected phase-windings are known as typical phase-windings of an AC generator. One lead-end of each of star-connected phase-windings is gathered at a suitable position, and the other lead-end thereof is connected to an outside electric load. On the other hand, both lead-ends of each delta-connected phase-windings are connected to form a triangle having three joints, which are connected to an outside electric load.

The above-described connection between different phase-windings is located at coil-end groups formed at opposite ends of a stator core. The lead-end of each phase-winding extends along the ridge of the coil-end groups to the lead-ends of other phase-windings. These lead-ends are bound by threads to the coil-end groups to prevent the lead-ends from contacting with a rotor or a housing, as disclosed in JP-A-2-214445. It is also known that a portion of the lead-ends is inserted into stator's slots having additional conductor members to shorten the threads or reduce the number of threads to zero.

In the stator disclosed in JP-A-2-214445, the thread binding takes considerable work. Such thread binding work may hurt insulation coatings of the windings, resulting in an insulation problem.

It is also difficult to insert such lead-ends in some of the slots because of recent high power structure of the stator that has a high space factor of the winding.

SUMMARY OF THE INVENTION

Therefore, it is an object of the invention to provide an improved stator of a vehicle AC generator that has lead-ends easily and surely fixed to a coil-end group.

It is another object of the invention to provide a stator of a vehicle AC generator that has lead-ends well insulated from the coil-end group.

According to an aspect of the invention, a stator of a vehicle AC generator includes a stator core having a plurality of slots, a plurality of phase-windings formed of a plurality of conductor members. The stator winding has first and second coil-end groups formed of portions of the conductor members extending from the slots to opposite ends of the stator core. Each of the phase-windings has a lead-end which partially covered with an insulation member and extends along the first coil-end group to be connected to one another. The insulation member is bonded to the first coil-end group.

The insulation member has a thickness that provides distance to insulate the first coil-end group from the lead-ends.

In the stator, the insulation member can be an insulation tube through which the lead-end extends. The insulation tube can be formed of a textile that provides the insulation member with vibration resistance. The insulation member can be an insulation sheet disposed between the lead-end and the first coil-end group. The insulation member can be formed of an insulation adhesive resin.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A stator of a vehicle AC generator according to a first embodiment of the invention is described with reference to FIGS. 1–10.

Figure 1:
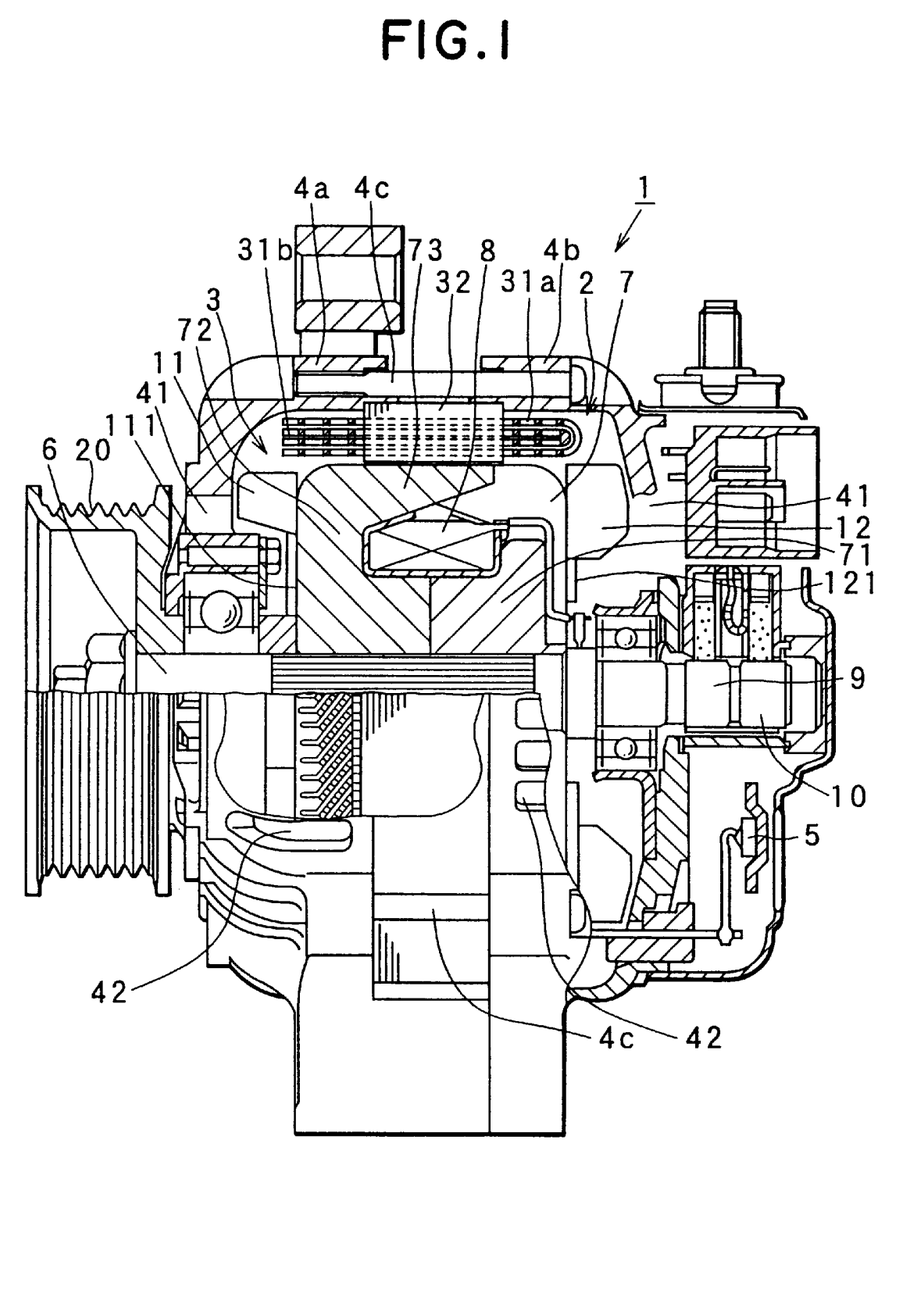
FIG. 1 is a partially cross-sectional side view of an AC generator for a vehicle according to a first embodiment of the invention.

Vehicle AC generator 1 includes stator 2 as an armature, rotor 3 as a magnetic field, a pair of front housing 4a and rear housing 4b, fastening bolts 4c, and rectifier 5. Front housing 4a and rear housing 4b support stator 2 therebetween and rotatably support rotor 3.

Rotor 3 rotates with shaft 6 and has Lundell type pole core 7, field coil 8, slip rings 9 and 10, mixed-flow-type cooling fan 11, and centrifugal cooling fan 12. Shaft 6 is linked with pulley 20 to be driven by an engine mounted in a vehicle (not shown).

Lundell type pole core 7 is formed of boss portion 71 fixed to shaft 6, disk portion 72 extending from opposite ends of boss portion 71 and twelve claw poles 73.

Mixed-flow-type cooling fan 11 is disposed near pulley 20 and rotates together with rotor 3. Mixed-flow-type cooling fan 11 has base plate 111 welded to the front surface of pole core 7, a plurality of inclined blades projecting from base plate 111 at an acute angle, and a plurality of right-angled blades. Centrifugal cooling fan 12 is disposed remote from pulley 20. Centrifugal cooling fan 12 has base plate 121 which is welded to the rear surface of pole core 7 and a plurality of right-angled blades.

The pair of housings 4a and 4b has a plurality of air intake windows 41 at the opposite axial ends thereof and a plurality of air discharge windows 42 at opposite shoulder portions thereof around first coil-end group 31a of stator 2 and second coil-end group 31b thereof.

Rectifier 5 is disposed at a rear portion of AC generator 1 remote from pulley 20, so that first coil-end group 31a is disposed to correspond to rectifier 5.

Stator 2 includes stator core 32 having a plurality of slots 35, a plurality of conductor members forming a stator winding and insulators 34 insulating the conductor members from stator core 32, which is disposed between front housing 4a and rear housing 4b.

Figure 2:
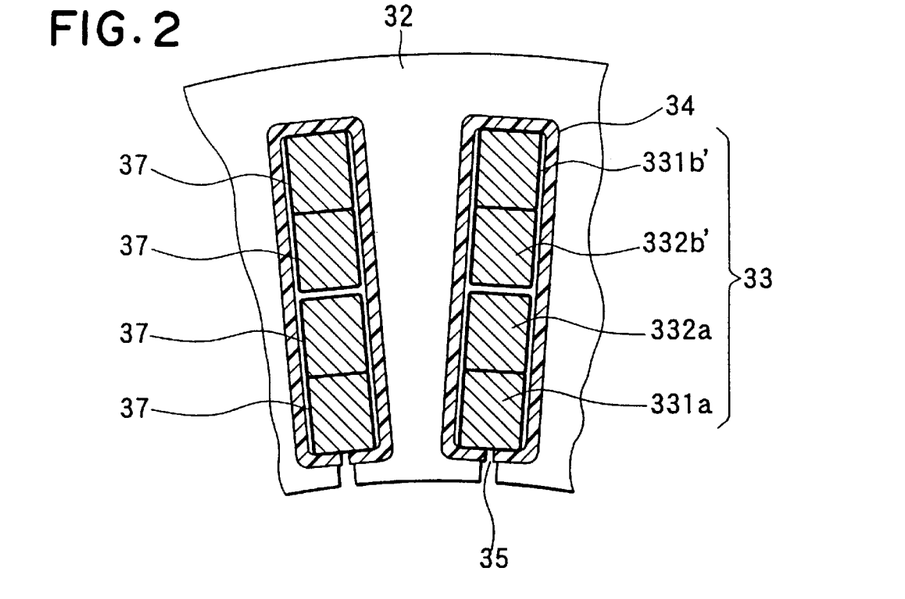
FIG. 2 is a fragmentary cross-sectional view of a stator according to the first embodiment.

As shown in FIG. 2, stator core 32 has a plurality of (e.g. thirty six) slots 35 circumferentially formed at equal intervals to accommodate a plurality of (e.g. three) phase-windings.

The stator winding accommodated in the slots 35 is composed of a plurality of conductor members, and a set of an even number (e.g. four) conductor members are disposed in each slot 35. The four conductor members of each set are respectively disposed in the following radially aligned layers: innermost layer, inner middle layer, outer middle layer, and outermost layer. Each set of four conductor members in the same slot is included in one of the phase-windings.

These conductor members are connected in a prescribed pattern to form the stator winding. The conductor members has continuous portions in first coil-end group 31a and connection portions in second coil-end group 31b. One of the conductor members extending from each slot 35 is paired with another conductor member extending from another slot that is spaced apart at a prescribed pole-pitch.

One conductor member extending from one layer of one of slots 35 is paired with another conductor member extending from a different layer of another slot that is spaced apart at the prescribed pole-pitch, so that distances between the conductor members in the coil-end groups can be evenly provided.

For example, conductor member 331a in the innermost layer of one slot is paired with conductor member 331b in the outermost layer of the slot that is spaced apart therefrom at one pole-pitch in the clockwise direction. In the same manner, conductor member 332a in the inner middle layer is paired with conductor member 332b in the outer middle layer of the slot that is spaced apart therefrom at one pole-pitch in the clockwise direction.

The paired conductor members are respectively jointed by continuous portions including turn portions 331c and 332c at one end of stator core 32.

Therefore, at one end of stator core 32, the continuous portion that joints the conductor members in the outer middle layer and the inner middle layer is surrounded by the continuous portion that joints the conductor members in the outermost layer and the innermost layer. Thus, the continuous portion of one pair of conductor members is surrounded by the continuous portion of another pair of conductor members that are disposed in the same pair of slots. The continuous portion of the conductor members in the outer middle layer and inner middle layer form an internal coil-end, and the continuous portions of the conductor members in the outermost and innermost layers form an external coil-end.

On the other hand, conductor member 332a in the inner middle layer in one slot is also paired with conductor member 331a' in the innermost layer in another slot that is one pole-pitch spaced apart therefrom in the clockwise direction. In the same manner, conductor member 331b' in the outermost layer in the same one slot is paired with conductor member 332b in the outer middle layer in the same another slot that is one pole-pitch spaced apart therefrom in the clockwise direction. These conductor members are welded together at the other end of stator core 32.

Therefore, connection portions of the conductor members in the outermost layer and in the outer middle layer and connection portions of the conductor members in the innermost layer and in the outer middle layer are aligned in the circumferential direction at the other end of stator core 32. The connection of conductor members in the outermost layer and the conductor members in the outer middle layer and the connection of the conductor members in the innermost layer and conductor members in the inner middle layer form adjoining layers of coil-ends.

Thus, the connection portions of the conductor members are regularly disposed at the other end of stator core 32 without overlapping.

Figure 3:
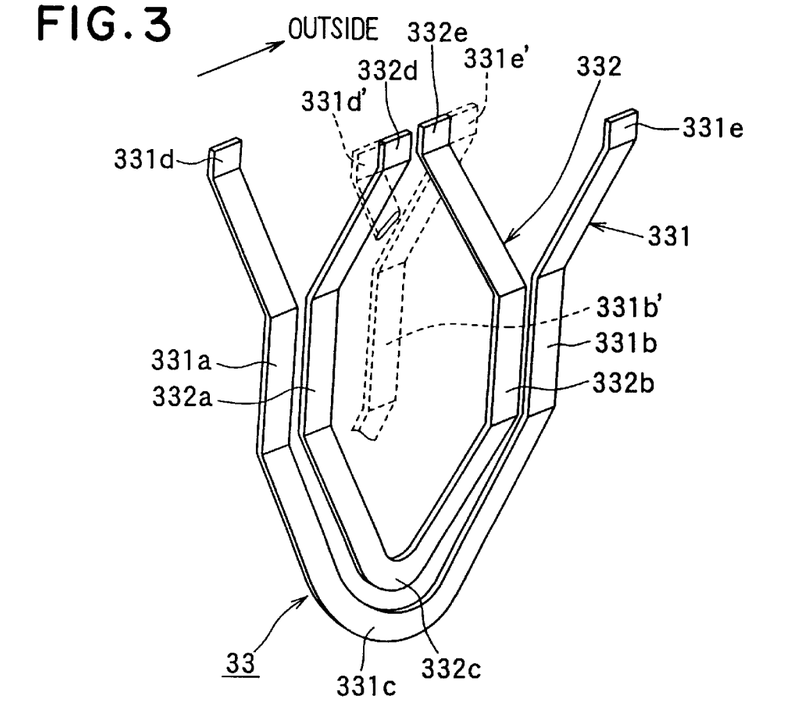
FIG. 3 is a schematic perspective view of a base segment unit according to the first embodiment.

The plurality of the conductor members are provided by specific shape conductor segments having a fixed rectangular cross section. As shown in FIG. 3, the conductor members in the innermost layer and the outermost layer are provided by generally U-shaped large segment 331, and the conductor members in the inner middle layer and in the outer middle layers are provided by generally U-shaped small segment 332.

Large segment 331 and small segment 332 form base segment unit 33. A plurality of base segment units 33 are regularly inserted into the plurality of slots 35 to form a two-turn coil turning around stator core 32 twice. The two-turn coil is formed of a first turn coil and a second turn coil connected in series by a specific segment different from any one of the segments forming base segment unit 33. Three different specific segments are used in the stator according to the first embodiment.

A winding diagram of X-phase-winding of the three phase windings is explained with reference to FIGS. 4–7, where the conductor member in the outermost layer of the slot is indicated by a one-dot chain line, the conductor member in the outer middle layer of the slot is indicated by a broken line, the conductor member in the inner middle layer is indicated by a solid line, and the conductor member in the innermost layer is indicated by a two-dot chain line. First coil-end group 31a having the turn portions is shown at the top, and second coilend group 31b having the connection portions is shown at the bottom. The numerals shown at the middle between the top and bottom indicate respective slot numbers. The above arrangement is the same in FIGS. 4–7.

Figure 4:
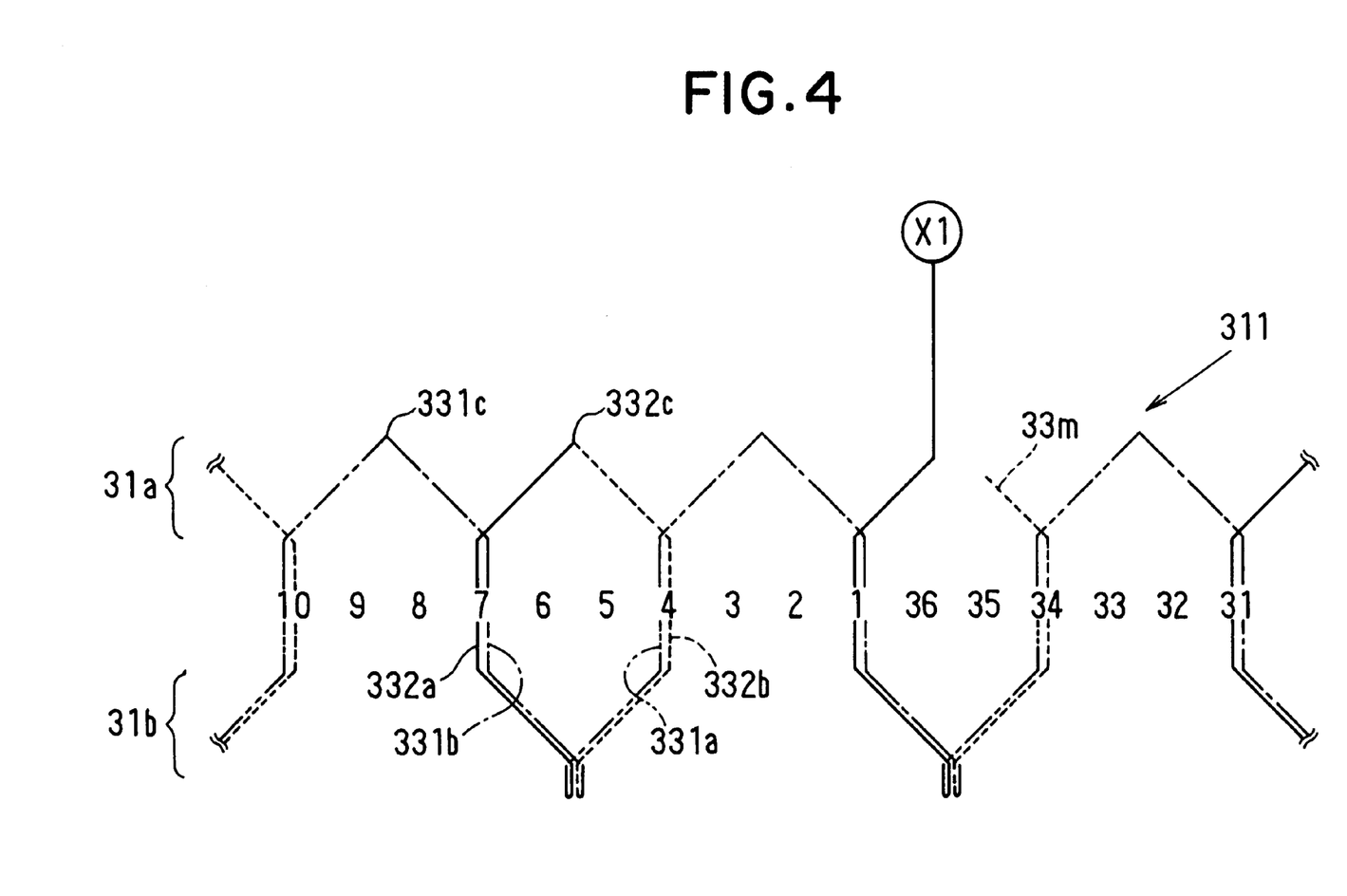
FIG. 4 is a portion of a winding diagram of a stator winding according to the first embodiment.

As shown in FIG. 4, base segment unit 33 of X-phase-winding is disposed in slot No. 1 and other slots at intervals of three slots. In second coil-end group 31*b*, one end of the conductor member extending from the outer middle layer (hereinafter referred to as the outer middle conductor member) of one of slots 35 is welded to an end of the conductor member extending from the outermost layer (hereinafter referred to as the outermost conductor member) of another slot that is one pole-pitch spaced apart therefrom in the clockwise direction. One end of the conductor member extending from the innermost layer (hereinafter referred to as the innermost conductor member) of one of slots 35 is welded to an end of the conductor member extending from the inner middle layer (hereinafter referred to as the inner middle conductor member) of another slot that is one pole-pitch spaced apart therefrom in the clockwise direction. Thus, lap-wound first sub-phase-winding 311, which has two turns each slot, is formed.

Figure 5:
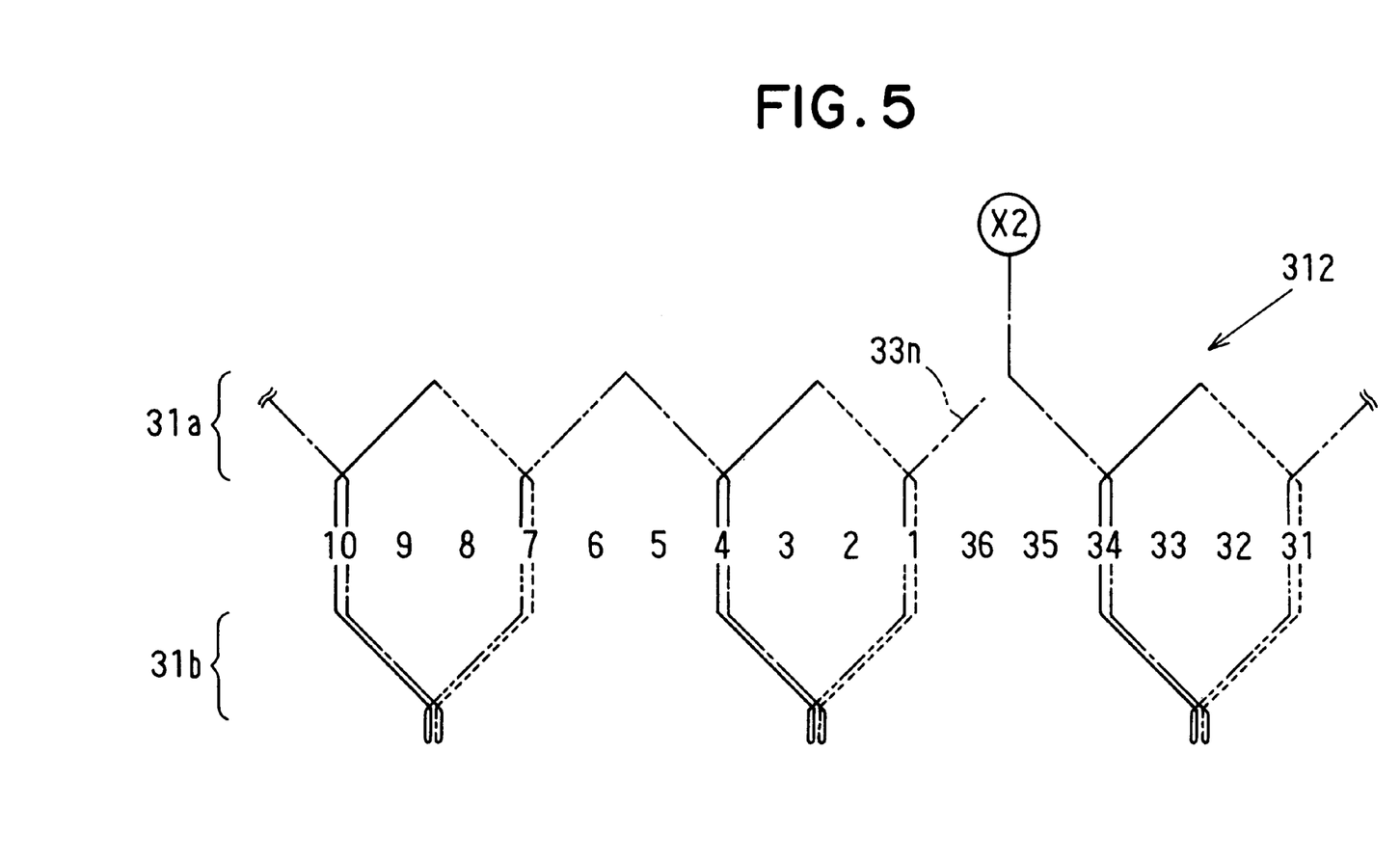
FIG. 5 is a portion of a winding diagram of a stator winding according to the first embodiment.
Figure 6:
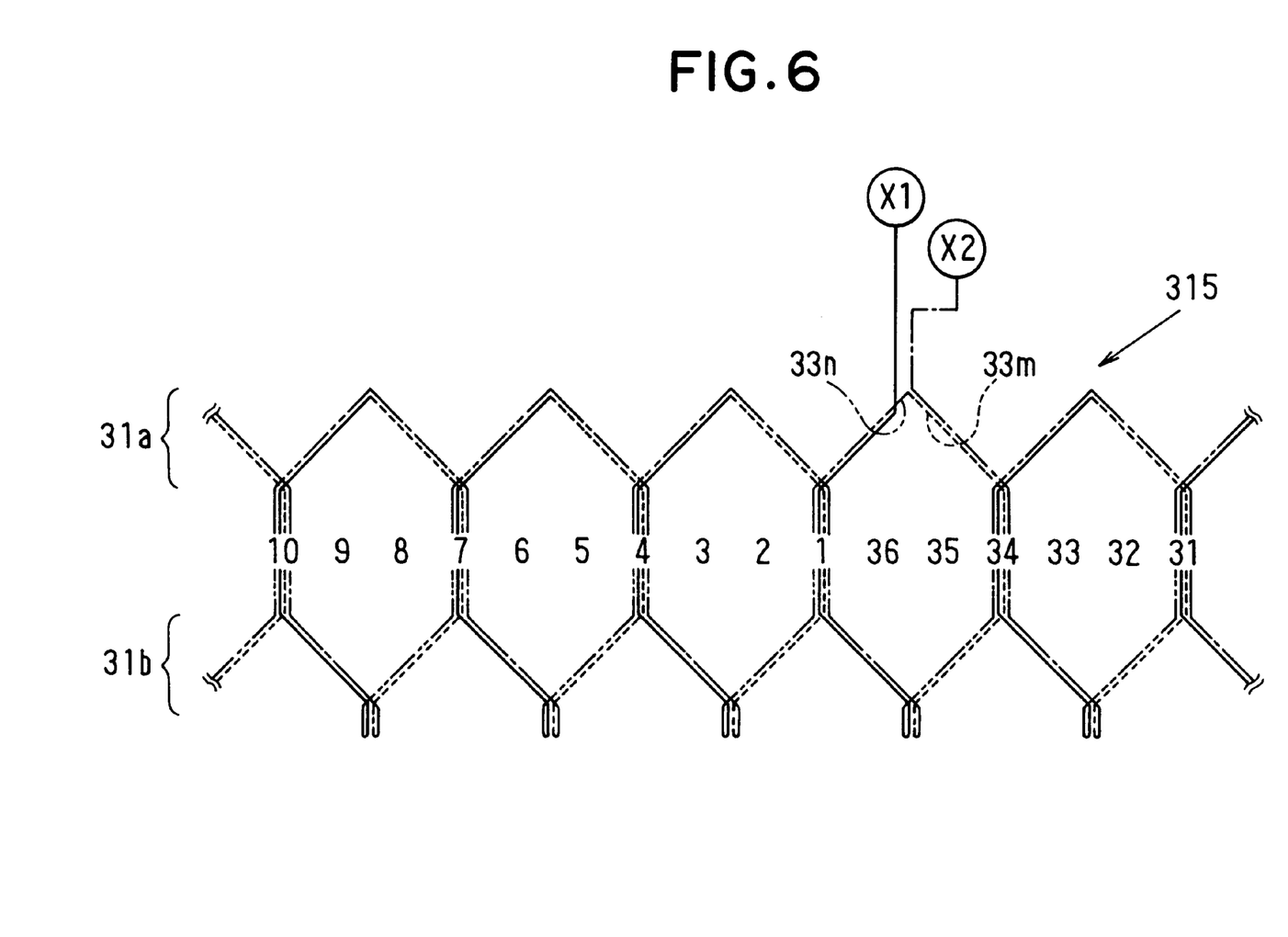
FIG. 6 is a portion of a winding diagram of a stator winding according to the first embodiment.

Lap-wound second sub-phase-winding 312 shown in FIG. 5 is also formed in the same manner as above. As shown in FIG. 6, lead-end 33*m* of first sub-phase-winding 311 is connected to lead-end 33*n* of second sub-phase-winding is connected to form four-turn X-phase-winding 315. The specific segment having the turn portion connecting lead-end 33*m* and lead-end 33*n* is different from any of large segment 311 and small segment 312 of base segment unit 33.

Figure 7:
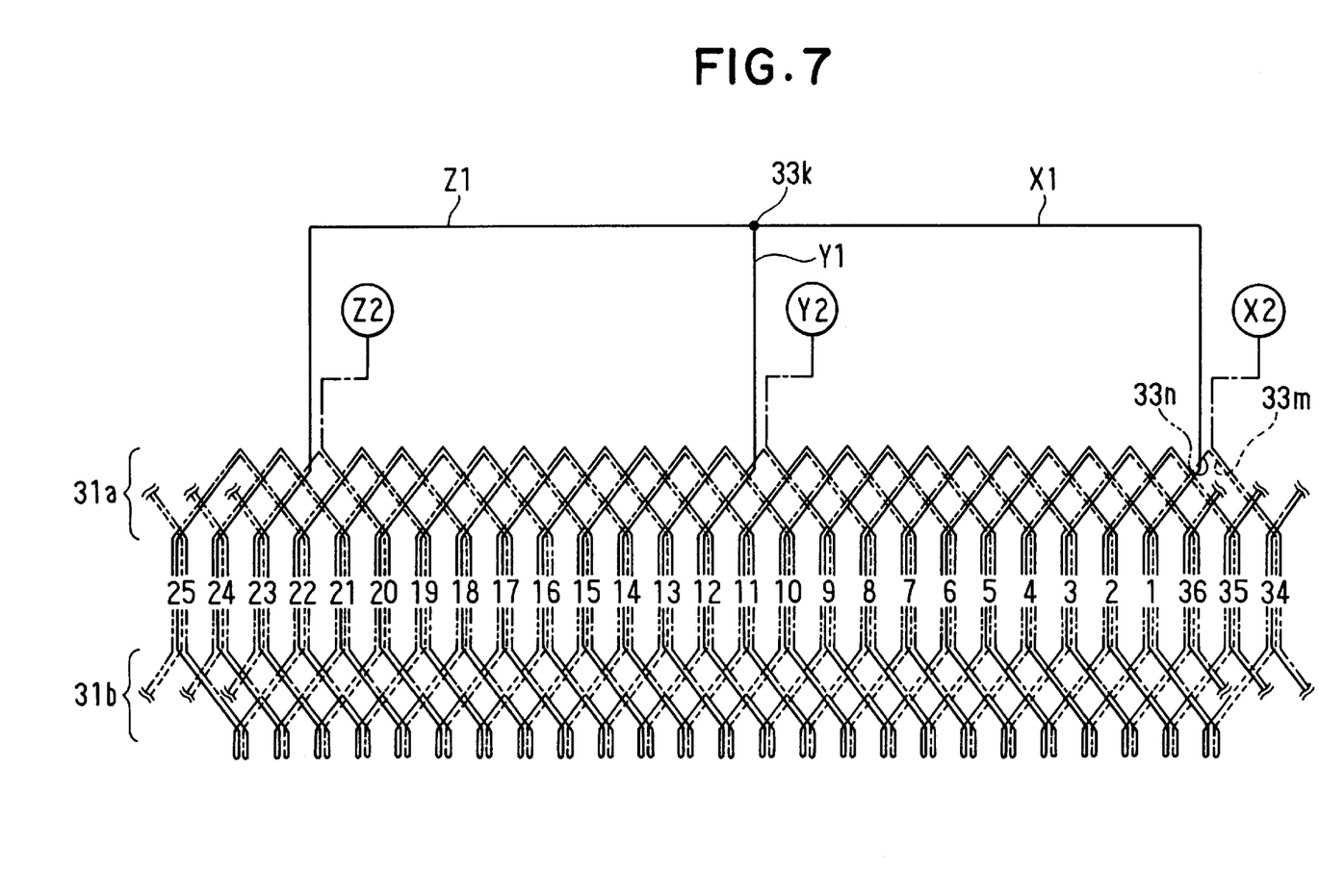
FIG. 7 is a main portion of a winding diagram of a stator winding according to the first embodiment.
Figure 8:
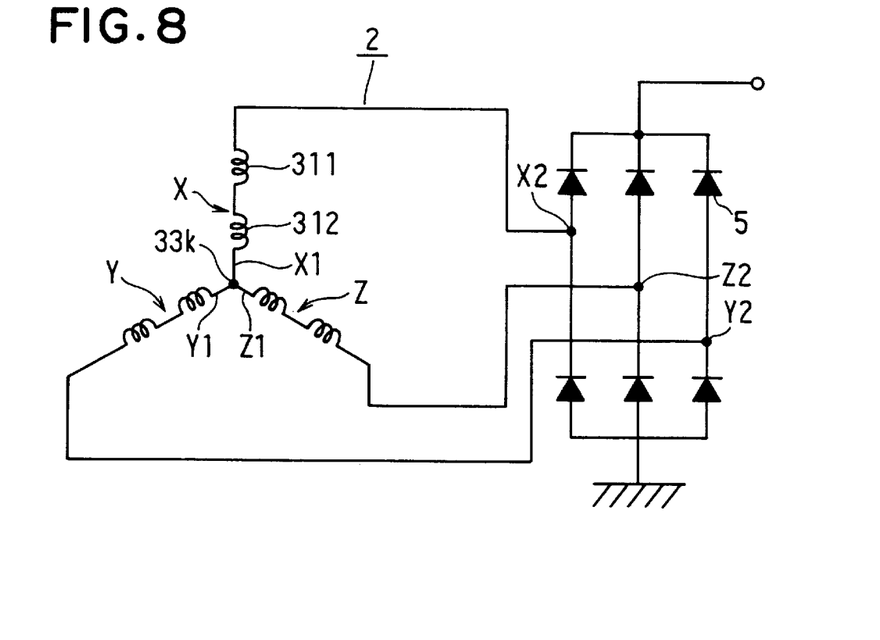
FIG. 8 is a circuit diagram of the AC generator according to the first embodiment.

Y-phase winding and Z-phase-winding, which are formed in the same manner as X-phase-winding, are respectively disposed in those of slots 35 which are 120° different in electric phase from other phase-windings, as shown in FIG. 7. First lead-ends X1, Y1 and Z1 of X-phase winding, y-phase winding, and Z-phase winding are connected to each other to form neutral point 33*k*. Second lead-ends X2, Y2 and Z2 of X-phase winding, y-phase winding, and Z-phase winding are respectively connected to input terminals of rectifier 5. Thus, a DC power circuit including a star-connected stator winding and three-phase full-wave rectifier 5 is formed as shown in FIG. 8. Lead-end X2 connected to one of the input terminals of rectifier 5 extends from first coil-end group 31*a*.

The stator winding is formed as follows. Base segment unit 33 is formed so that turn portion 332*c* of U-shaped small segment 332 is surrounded by turn portion 331*c* of U-shaped large segment 331. Base segment unit 33 is inserted to slots 35 from an axial end of stator core 32 in the following manner: conductor member 331*a* of large segment 331 is disposed in the innermost layer of one slot; conductor member 332*a* of small segment 332 is inserted into the inner middle layer of the above-said one slot; conductor member 331*b* of the same large segment 331 is inserted into the outermost layer of another slot that is spaced apart at one pole-pitch from the one slot in the clockwise direction; and the other conductor member of the same small segment 332 is inserted into the outer middle layer of the above-said another slot.

As a result, four conductor members, such as conductor members 331*a*, 332*a*, 332*b*' and 331*b*' shown in FIG. 2, are aligned radially in each of all slots 35.

Thereafter, in second coil-end group 31*b*, connection portions 331*d* and 331*e* of the conductor members disposed in the outermost and the innermost layers are respectively bent to open the mouth of large segment 331 by one and a half slot-pitch.

On the other hand, connection portions 332*d* and 332*e* of the conductor members disposed in the outer middle and the inner middle layers are respectively bent to close the mouth of small segment 332 by one and a half slot-pitch. The above step is repeated for all base segment units 33.

Sub-phase-windings of each phase-winding are connected by specific segments as described before.

In second coil-end group 31*b*, connection portion 331*e*' of the outermost conductor member and connection portion 332*e* of the outer middle conductor member are welded or soldered together, and connection portion 332*d* of the inner middle conductor member and connection portion 331*d*' of the innermost conductor member are welded or soldered together, by a welder such as a supersonic welder, an arc welder, or a soldering tool. Thus, stator 2 is formed.

In first coil-end group 31*a*, lead-ends X1, and Z1 are extended along the ridge line of first coil-end group 31*a* to be connected to lead-end Y1, which extends in the axial direction, to form neutral point 33*k*. This connection is to shorten the length of the lead-ends extending along first coil-end group 31*a*.

Figure 9:
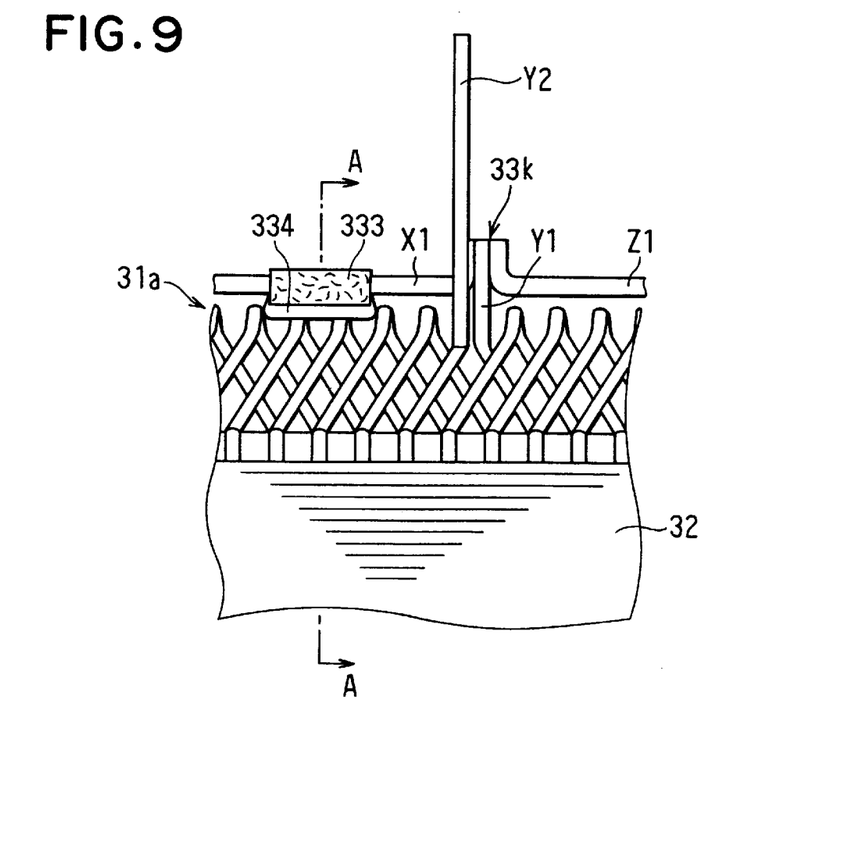
FIG. 9 is a fragmentary side view of a coil-end group of the stator according to the first embodiment.
Figure 10:
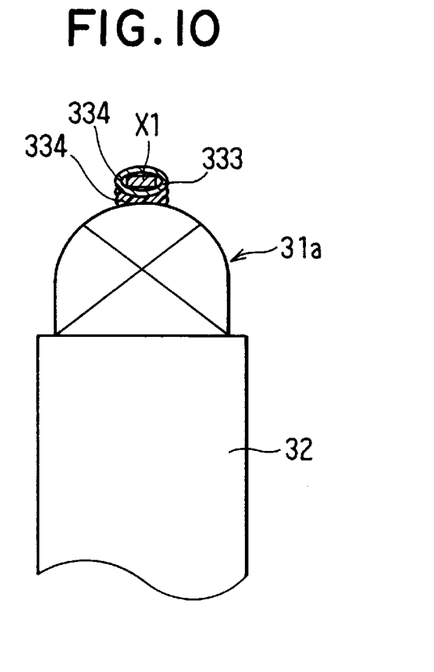
FIG. 10 is a cross-sectional schematic view of a coil-end group according to the first embodiment cut along line X—X in FIG. 9.

As shown in FIG. 9, lead-end X1 of X-phase-winding (and also lead-end Z1 of Z-phase-winding) is partly covered by flexible textile insulation tube 333. As shown in FIG. 10, lead-end, which has a rectangular cross-section, is disposed on the ridge with its longer side down, thereby restricting the axial length of stator 2.

Insulation tube 333 is bonded to first coil-end group 31*a* by an adhesive made of a epoxy resin. Because textile insulation tube 333 is impregnated with the adhesive, lead-ends X1 and Z1 are also bonded together. Thus, lead-ends X1 and Z1 can be fixed to first coil-end group 31*a* very easily to be resistant to vibration. Insulation tube 333 has a thickness to form gaps between lead-ends X1 or Z1 and first coil-end group 31*a*.

The other lead-ends X2, Y2 and Z2 extend from first coil-end group 31*a* and connected to the respective input terminals of rectifier 5. One of insulation tubes 333 of both lead-ends X1 and Z1 can be omitted if the length thereof can be reduced by arranging lead-ends X2, Y2 and Z2. For example, if lead-end Z1 is shorter than the others, insulation tube 333 is applied only to lead-end X1.

Figure 11:
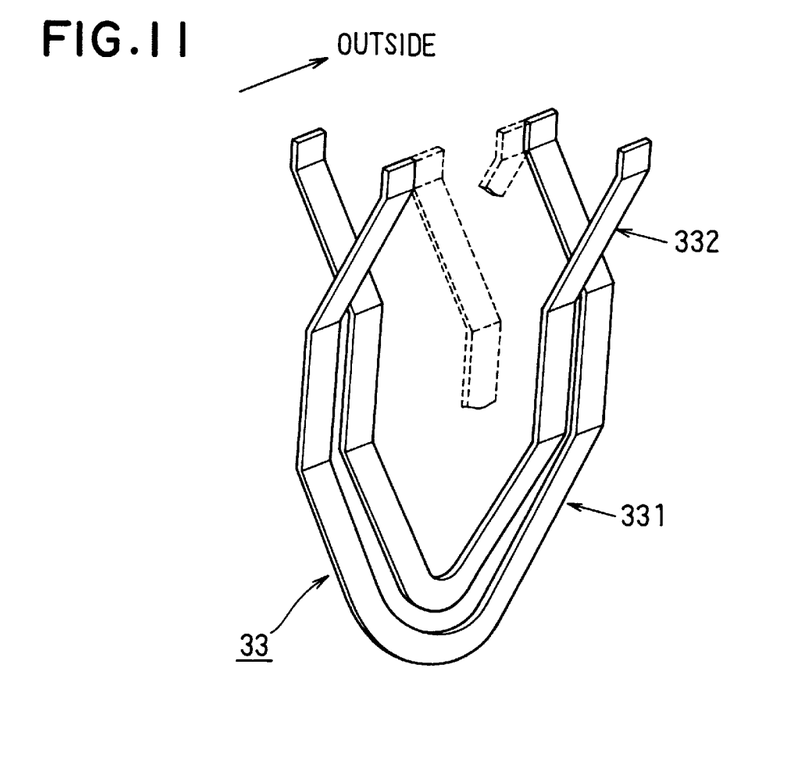
FIG. 11 is a schematic perspective view of a base segment unit according to a second embodiment of the invention.

A second embodiment of the invention is shown in FIG. 11. The outermost and inner most conductor members can be bent to close the mouth of large segment 331 of base segment unit 33 if the outer middle and inner middle conductor members are bent to open the mouth of small segment 332.

Figure 12:
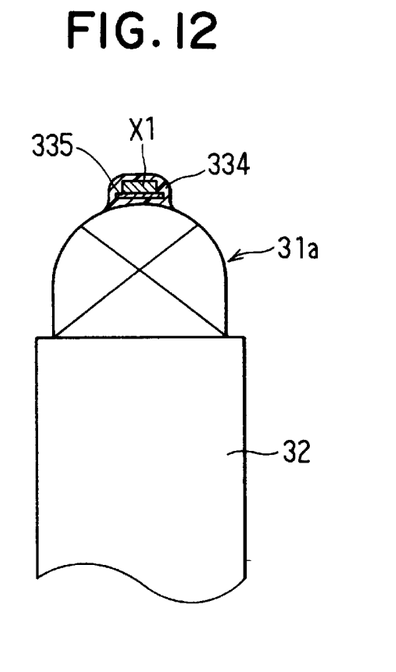
FIG. 12 is a cross-sectional schematic view of a coilend group according to a third embodiment.

A third embodiment of the invention is shown in FIG. 12. Textile insulation sheets 335 can be disposed between each of lead-ends X1 and Z1 and first coil-end group 31*a* instead of insulation tubes 333. Adhesive 334, made of heat-resistant insulation resin such as epoxy resin, is applied to cover insulation sheets 335 and lead-ends X1 and Z1. Insulation sheets 335 are made of varnished glass fiber. Thus, insulation sheets 335 and adhesive 334 can be applied easily after all the connection works are finished.

Figure 13:
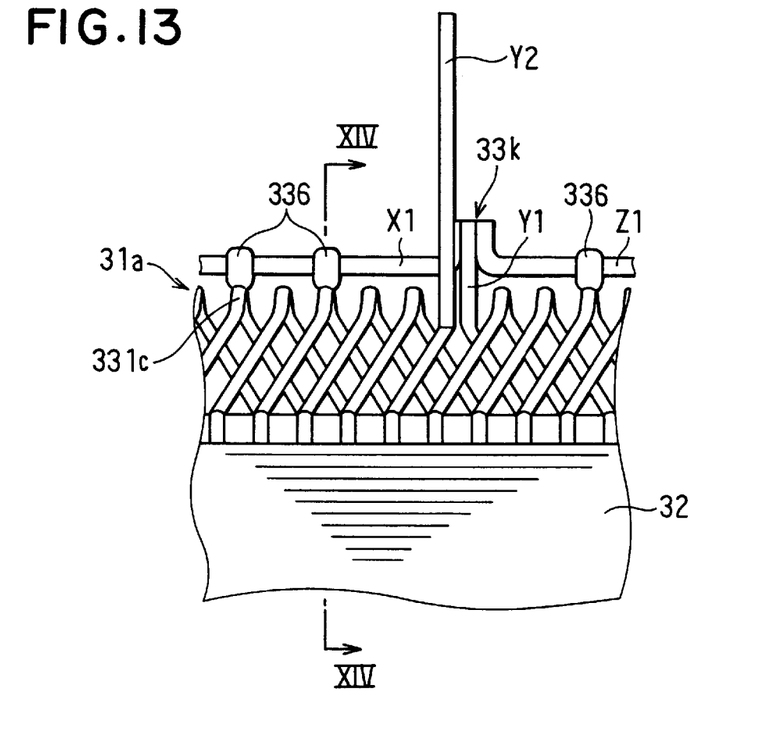
FIG. 13 is a fragmentary side view of a coil-end group of the stator according to a fourth embodiment of the invention.
Figure 14:
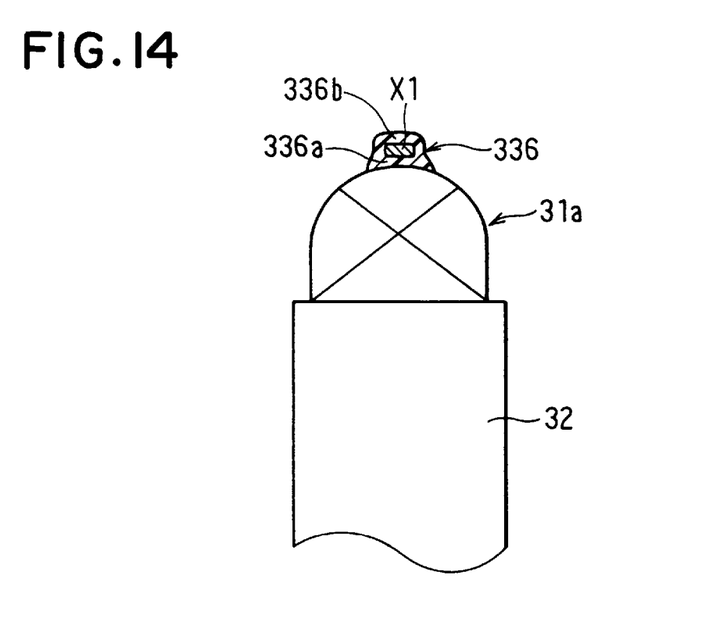
FIG. 14 is a cross-sectional schematic view of a coil-end group according to the first embodiment cut along line XIV—XIV.

A fourth embodiment of the invention is shown in FIGS. 13 and 14. Lead-ends X1 and Z1 are covered with an insulation adhesive 336 made of a heat-resistant material such as epoxy resin or silicone resin, however, without any insulation tube or sheet. After lead-ends X1 and Z1 are extended along the ridge of first coil-end group 31*a* toward lead-end Y1 and connected together to form neutral point 33*k*, lead-ends X1 and Z1 are pressed against first coil-end group to reduce distance between lead-ends X1, Z1 and first coil-end group 31*a* to form gaps suitable for capillary function.

Thereafter, adhesive 336 is applied to lead-ends X1 and Z1 and turn portions 331*c* of first coil-end group 31*a*. Adhesive 336 spreads into many gaps because of the capillary function and forms internal insulation layers 336*a* between each of lead-ends X1, Z1 and turn portions 331*c*. External insulation layers 336*b* are formed to cover lead-ends X1 and Z1.

As shown in FIG. 13, lead-ends X1 and Z1 are bonded by insulation layers 336*b* at a plurality of portions. The viscosity of adhesive 336 should be controlled to mainly form internal insulation layers 336*a*.

Figure 15:
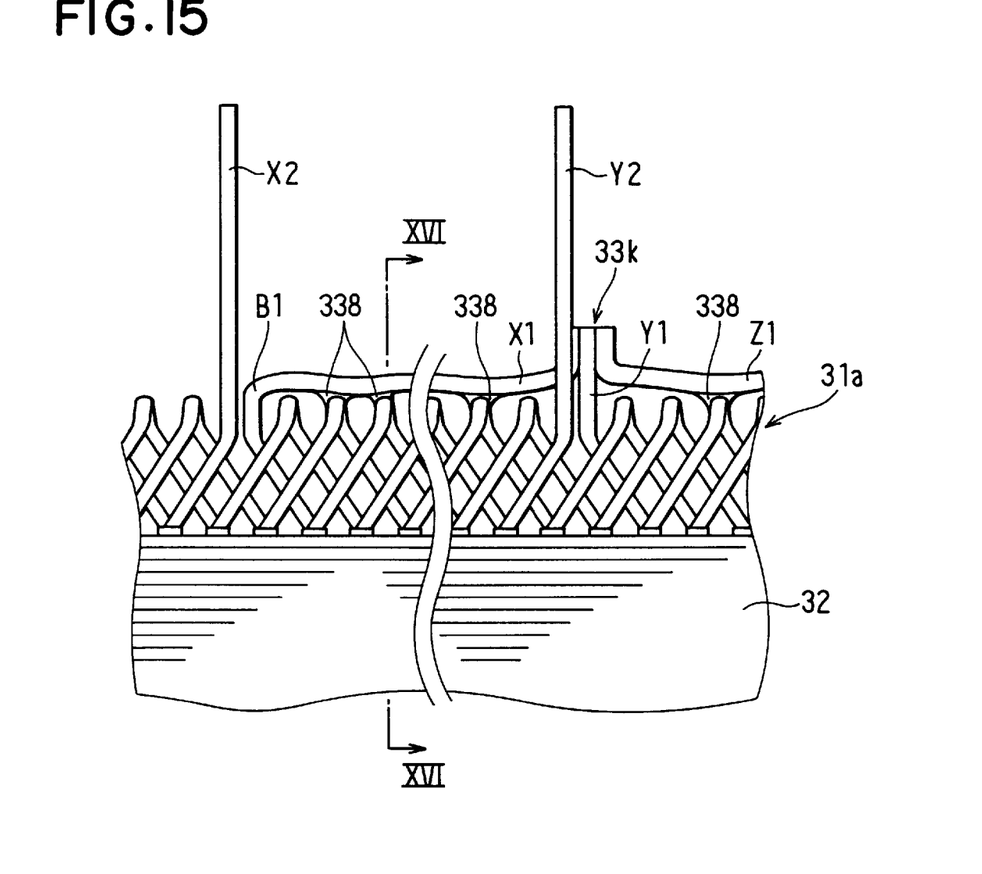
FIG. 15 is a fragmentary side view of a coil-end group of the stator according to a fifth embodiment of the invention.
Figure 16:
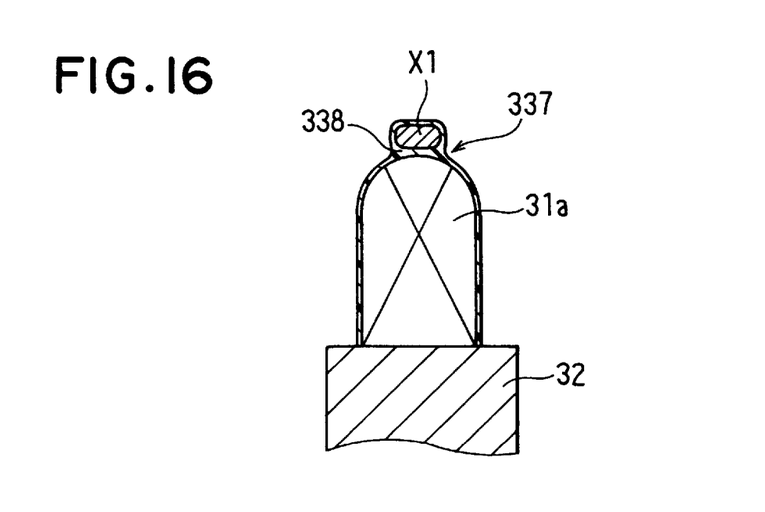
FIG. 16 is a cross-sectional schematic view of a coil-end group according to the fifth embodiment cut along line XVI—XVI in FIG. 15.

A fifth embodiment of the invention is shown in FIGS. 15 and 16.

Lead-ends X1 and Z1 respectively have bent portions B1 as well as common neutral point 33*k*. Lead-ends X1 and Z1 respectively extend along the ridge of first coil-end group 31*a* and bonded to the ridge at a plurality of portions thereof at bonded portions 338, which are formed from liquid resin 337, a known impregnation material, gathering in gaps between leadends X1, Z1 and first coil-end group 31*a*. In other words, bonded portions 338 are formed in some gaps between lead-ends X1, Z1 and the edges of turn portions 331*c* of first coil-end group 31*a*. Bonded portions 338 are not formed in other gaps between lead-ends X1, Z1 and the edges of turn portions 331*c*, thereby, to provide effective cooling surfaces of first coil-end group 31*a*. Resin 337 covers the whole surface of neutral point 33*k* to protect the same. Resin 337 also covers almost the whole surface of first coil-end group 31*a* to protect the same. Thus, resin 337 not only protects the surface of coil-end groups but bonds the conductor members together. Liquid resin 337 spreads into the inside of stator core 32 to bond adjacent portions of the stator 2.

In this embodiment, two lead-ends X1 and Z1 are respectively bent at bent portion B1 toward lead-end Y1. Then, lead-ends X1, Y1 and Z1 are welded together to form neutral point 33*k*. Thereafter, lead-ends X1 and Z1 are pressed against first coil-end group 31*a*. Liquid resin 337 having a suitable viscosity is then dropped from above first coil-end group 31*a* on neutral point 33*k* and other surfaces of first coil-end group 31*a* including lead-ends X1 and Z1, so that the most liquid resin 337 can get into the inside of stator 2 and thin coatings can be formed on first coil-end group 31*a*. Portions of liquid resin 337 gathers at portions of first coil-end group 31*a* adjacent to lead-ends X1 and Z1 and become solid to form bonded portions 338.

Thus, not only neutral point 33*k* and lead-ends X1 and Z1 are protected and fixed but also sufficient cooling surfaces are provided. Textile insulation tube 333 is effective to increase bonded portions.

The present invention can be applied to a stator having a delta-connected stator winding in the same manner. The lead-ends can be extended from second coil-end group 31*b*. The base segment unit 33 can have I-shaped segments instead of U-shaped segments. The present invention can be also applied to a stator winding formed of a continuous magnetic wire.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than a restrictive, sense.

What is claimed is:

1. A stator of a rotary electric machine comprising:
 a stator core having a plurality of slots;
 a plurality of phase-windings respectively formed of a plurality of conductor members inserted in said plurality of slots; wherein
 said stator winding has first and second coil-end groups formed of portions of said plurality of conductor members respectively extending from said plurality of slots to opposite ends of said stator core,
 each of said phase-windings has a lead-end of a different length which extends along said first coil-end group connected to one another, and
 the longest one of said lead end has an insulation member bonded to said first coil-end group.

2. The stator as claimed in claim 1, said plurality of conductor members are connected to form said plurality of phase-windings.

3. The stator as claimed in claim 2, wherein one of said first and second coil-end groups is formed by continuous wires, and the other is formed by connecting said conductor members.

4. The stator as claimed in claim 3, wherein said lead-end is disposed at said one of said coil-end groups formed by said continuous wires.

5. The stator as claimed in claim 3, wherein said lead-end is disposed at said the other coil-end group formed by connecting said conductor members.

6. The stator as claimed in claim 2, said conductor members are disposed in a plurality of layers in one of said first and second coil-end groups, and said conductor members are connected to form lap windings in the other coil-end group.

7. A stator of a rotary electric machine comprising:
 a stator core;
 a plurality of phase-windings having coil-end groups respectively at opposite ends of said stator core, wherein
 each of said phase-windings has a lead-end which extends circumferentially along said coil-end group, and
 an adhesive is disposed between said lead-end and said coil-end group,
 wherein said lead-end is connected to another lead-end, and said adhesive comprises a resinous member covering a portion where said lead-end is connected.

8. The stator as claimed in claim 7, wherein said resinous member comprises portions impregnated into inside portions of said stator core.

9. The stator as claimed in claim 7 wherein said lead-end forms a neutral point of said plurality of phase-windings.

10. The stator as claimed in claim 7, wherein said adhesive is disposed between said lead-end and a top of said coil-end group.

11. The stator as claimed in claim 7, wherein each of said plurality of phase-windings comprise a plurality of conductor members connected to one another.

12. The stator as claimed in claim 7, wherein each of said plurality of phase-windings comprise a plurality of U-shaped conductor segments connected to one another.

13. The stator as claimed in claim 7, further comprising a textile disposed between said lead-end and said coil-end group.

14. The stator as claimed in claim 7, wherein each said lead-end has a flat surface disposed opposite a respective said coil-end group.

\* \* \* \* \*